Aug. 12, 1969　　　W. J. HOLT, JR　　　3,461,326
TUNING FORK
Filed Nov. 22, 1965　　　3 Sheets-Sheet 1
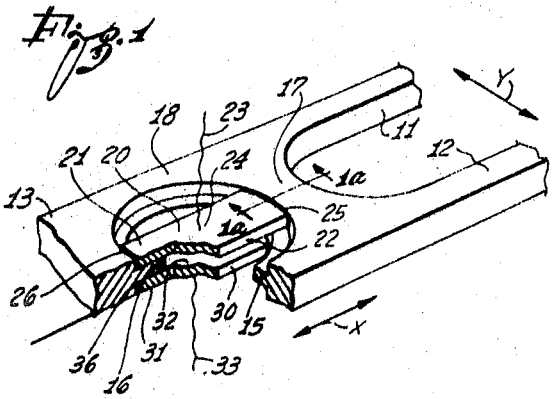
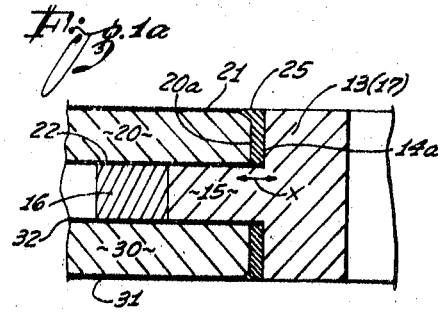
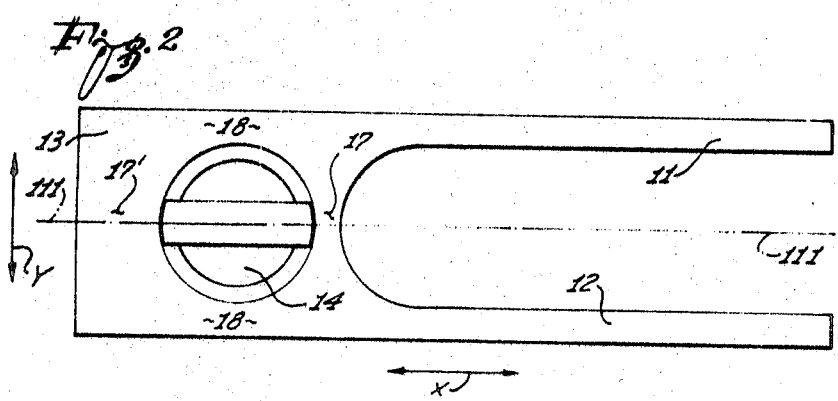
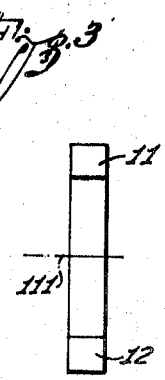
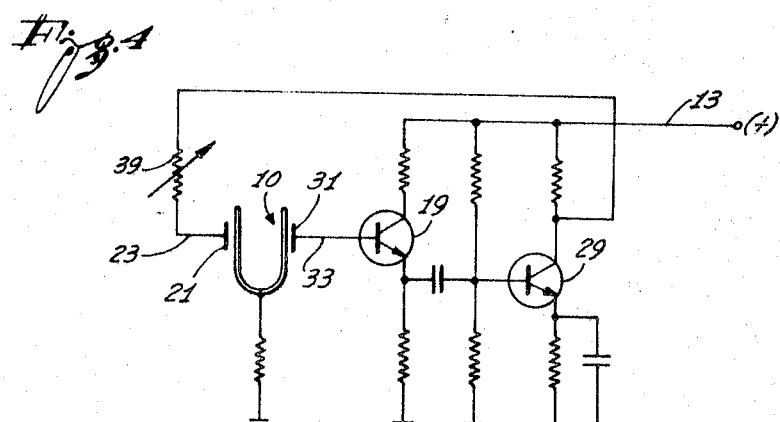
INVENTOR:
William J. Holt, Jr.
Attorneys Aug. 12, 1969   W. J. HOLT, JR   3,461,326
TUNING FORK
Filed Nov. 22, 1965   3 Sheets-Sheet 2
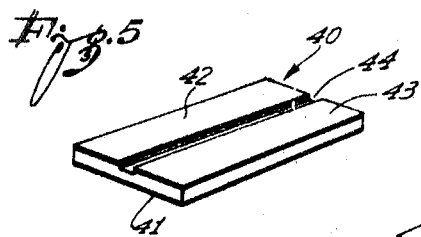
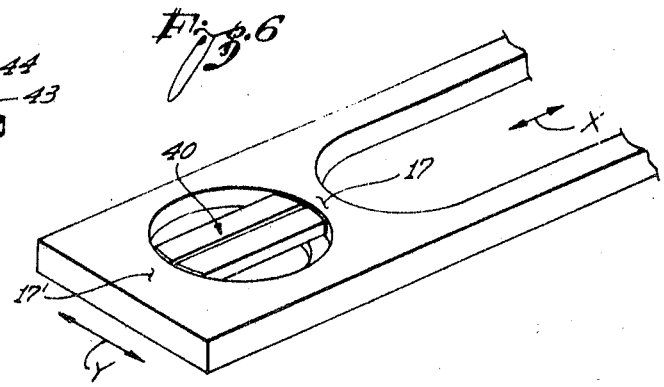
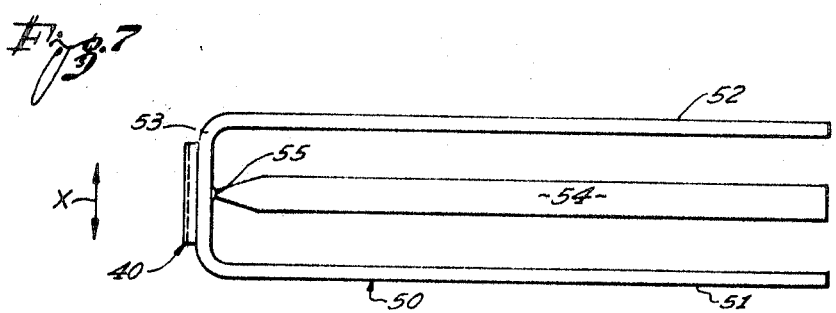
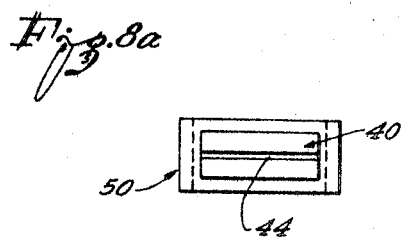
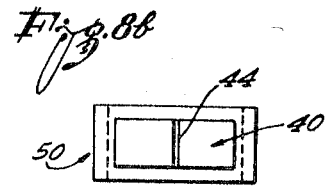
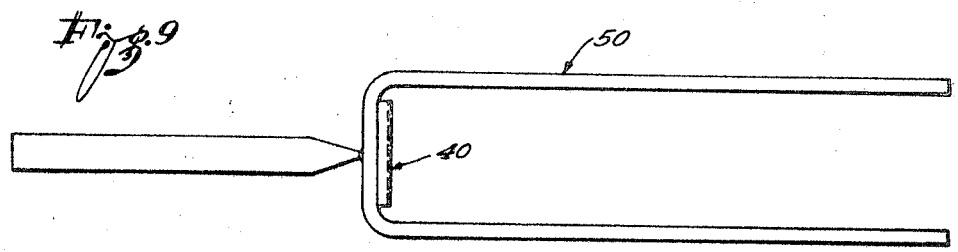
INVENTOR:
William J. Holt, Jr.
Attorneys Aug. 12, 1969  W. J. HOLT, JR  3,461,326
TUNING FORK Filed Nov. 22, 1965  3 Sheets-Sheet 3

INVENTOR:
William J. Holt, Jr.

By Smyth, Roston & Pavitt
Attorneys

United States Patent Office
3,461,326
Patented Aug. 12, 1969

3,461,326
TUNING FORK
William J. Holt, Jr., Pacific Palisades, Calif., assignor, by mesne assignments, to Varo Inc., Electrokinetics Div., Santa Barbara, Calif., a corporation of California
Filed Nov. 22, 1965, Ser. No. 509,097
Int. Cl. H02n 11/00
U.S. Cl. 310—8.2
20 Claims

ABSTRACT OF THE DISCLOSURE

This invention relates to a transducer wherein a tuning fork is agitated by a piezoelectric driver and a piezoelectric senson is located in a spaced relationship with the driver and monitors the vibrating tuning fork.

---

The present invention relates to a tuning fork with a drive arrangement. Tuning forks are widely used in electronic oscillators and as elements which determine the frequencies of the oscillators. The pronounced response peak of such a tuning fork at resonance frequency, particularly in the lower, audio frequency range is a very desirable feature for establishing frequency stability in an oscillator. Usually, the tuning fork is driven by an electromagnetic agitator coupled magnetically to the tine of the fork, and the agitator in turn, is driven by an amplifier the input of which is governed by a pickup device which senses the vibrations of the fork. The employment of magnetic effects has the drawback that it limits the application of such fork. In the case of a compact design a special shielding is required if magnetic stray fields cannot be tolerated. Additionally, specific magnetic properties for such a tuning fork are required which limits the choice of the material which can be employed as the vibrating element.

According to the present invention it is suggested to use piezoelectric devices as driving elements as well as pickup means for sensing the oscillations of tuning forks. A single fork will thus be equipped with a piezoelectric means which includes a driving portion and a vibration sensing portion. These portions may be integral or separate. The piezoelectric means is mounted to the fork itself in face-to-face relationship therewith, so that at least one area of the piezoelectric driving portion is coupled to a surface area of the fork. Another area of the piezoelectric means pertaining to the sensing portion thereof is coupled to the fork at a different surface area of the fork, whereby the two surface areas of the fork are displaced to each other in a direction perpendicular to the direction of mechanical vibration of at least one of the two surface areas of the fork. The piezoelectric means such as a crystal or crystals are coupled to the fork in a manner which permits transmission of mechanical vibrations either way from the fork to the crystal or vice versa, whereby in one area of coupling the vibrations are transferred to a crystal and in the other area the vibrations are transferred to the fork and from the same or from a second crystal.

The piezoelectric crystals preferably have flat configurations. Electrodes of similar dimensions are attached to the surfaces of the flat sides of the crystals. A flat crystal of this type will have a predominant direction of extension, and there are correspondingly short sides of such a crystal extending substantially perpendicularly to the flat side thereof. When electrical oscillation signals are applied to the electrodes the crystal will set up mechanical oscillations whereby the largest amplitude of such vibratory motion occurs in this direction of predominant extension of the crystal.

The tuning fork member when vibrating has surface portions which oscillate perpendicularly to their extension, and this is particularly so in the antinodal regions. The piezoelectric crystal is preferably mounted to the tuning fork in such a region and in such a manner that the surface of the crystal capable of vibrating at maximum amplitude is coupled in face-to-face relationship to such antinodal vibrating surface of the tuning fork member. This crystal may be accompanied by a second similar crystal in coplanar relationship as to the areas of contact with the fork. One of the two crystals senses the existing oscillations, i.e., the vibrations of the tuning fork itself and develops an electrical signal across its electrodes which is representative of these vibrations. The other crystal receives electrical driving signals of like frequency to stimulate and maintain the mechanical oscillations in the tuning fork. However, crystals are not required and in the preferred configuration the crystal has one of its flat electrodes biparted by a narrow gap or groove extending preferably in the direction of maximum oscillation of the crystal. The crystal portion underneath one of the electrodes serves as agitator whereby a driving signal is applied to that one electrode, and the other electrode will be used as sensor in that the crystal portion underneath is stimulated by the fork's oscillation. A common electrode underneath the crystal and covering the other flat side thereof entirely serves as counter reference electrode for the two electrodes separated by the groove. There has been observed very little cross coupling between the two crystal portions particularly because of the orientation of the groove.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIGURE 1 illustrates an isometric view and a partially cut open section of a preferred configuration for a tuning fork in accordance with the present invention;

FIGURE 1a illustrates a cross-sectional view along lines 1a—indicated in FIGURE 1;

FIGURE 2 illustrates a top view of the tuning fork shown in FIGURE 1;

FIGURE 3 illustrates a front view of the tuning fork shown in FIGURES 1 and 2;

FIGURE 4 illustrates schematically a circuit diagram for an oscillator circuit which employs the tuning fork illustrated in FIGURES 1 through 3 and others;

FIGURE 5 illustrates an isometric view of a single crystal having a biparted surface electrode to serve as sensor as well as agitator;

FIGURE 6 illustrates a tuning fork having similar configuration as illustrated in FIGURE 1 but employing a crystal of the type illustrated in FIGURE 5;

FIGURE 7 illustrates a side elevation of a tuning fork in accordance with a second embodiment of the present invention;

FIGURES 8a and 8b illustrate possible rear views of the tuning fork shown in FIGURE 7;

FIGURE 9 illustrates a side elevation of a tuning fork which as a modified version of the tuning fork illustrated in FIGURE 7;

Figure 13:
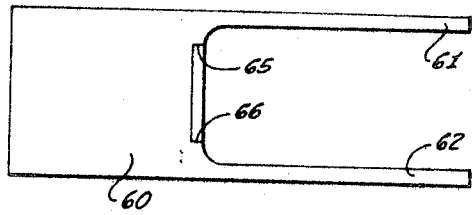
FIGURE 13 illustrates a side elevation of another embodiment of the present invention.
Figure 14:
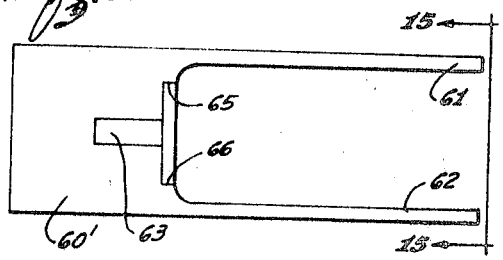
FIGURE 14 illustrates a side elevation of another embodiment of the present invention.
Figure 15:
Figure 16:
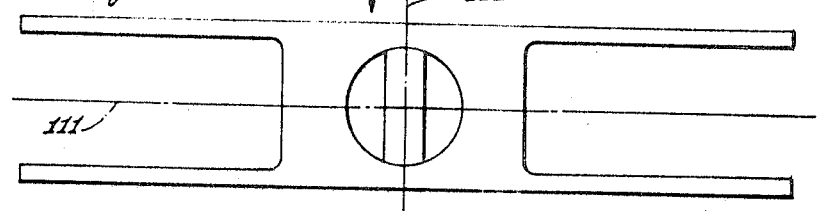

FIGURE 15 can be construed as a front view of either tuning fork as illustrated in FIGURE 13 or FIGURE 14; and FIGURE 16 illustrates a top elevation of a tuning fork in accordance with another embodiment of the present invention.

Proceeding now to the detailed description of the drawing, we turn first to FIGURES 1, 2 and 3 which illustrate the first embodiment of the present invention the operation of which will be explained subsequently with reference to FIGURE 4. There is shown a tuning fork member 10 having tines 11 and 12 and a joining section 13. This section 13 forms the bottom portion of the U-shaped tuning fork. The portion 13 has an aperture 14 which in the illustration is circular aperture but the particular configurration is not essential. However, it is apparent that for purposes of avoiding the development of undue harmonics the aperture 14 should have a symmetrical relation to the tines 11 and 12 and should have as regular configuration as possible so that a circular configuration seems to meet these desirable aspects best.

As can be seen best from FIGURE 1, aperture 14 has an inner rim 15 defining two ring shaped shoulders. On this rim 15, i.e., on either side or shoulder thereof there are seated two piezo-electric crystals 20 and 30. These crystals are flat thin almost rectangular wafers. The crystal 20 has on both of its flat sides a thin silver layer such as 21 and 22, whereby in particular the layer 22 makes metallic contact with the rim 15 to provide electrical contact between the body of the fork 10 and the layer 22. The crystal 30 has analogously two silver surface layers 31 and 32 and the layer 32 makes metallic contact with the other side of the rim 15.

One can see best from FIGURE 1a that the crystal 20 is beveled at its upper edge so that the electrode layer 21 slightly recedes from the body of the tuning fork. The layer 21 is thus sufficiently far from the metal of the tuning fork and does not make electric contact therewith. The curved side surfaces of the crystals 20 and 30 define very narrow channels between the round walls of the aperture 14, such as wall 14a, and these narrow channels are filled with an electrical insulating agent to serve also as bonding agent for securing the crystals to the body of the tuning fork 10. Epoxy is suited best for this purpose and reference numbers 25, 26 and 36 point to these epoxy filled regions.

It may be possible that during potting epoxy may creep in between the electrode layer 22 or 32 and the rim 15. For this purpose there is provided additionally an epoxy extension such as a ring 16 positioned so as to form a radially inwardly directed, physical extension of the rim 15. This extension 16 does not have to be ring shaped, but could be a small stud. However, a symmetrical structure is preferred. This extension such as ring 16 does not form an integral part of the tuning fork member 10 as originally manufactured. Ring 16 is subsequently added to the rim 15 during placement of the crystals into their respective positions.

Ring 16 comprises an epoxy which contains additionally silver and is thus rendered electrically conductive. This ensures metallic contact and provides also bonding. Particularly, the bonding connection between the silver layers 22 and 32 forming electrodes and the epoxy ring 16 cannot be displaced by any epoxy from the areas 25, 26, etc. Thus ring 16 provides an electrical contact between layers 22, 32, on one hand, and the rim 15, on the other hand, and from there through the entire body of the tuning fork 10. The surface layer 21 of crystal 20 is connected to a lead in wire 23 by means of a solder point 24, and, of course, there is an analogous lead in wire to the layer 32 of crystal 30.

FIGURES 1 and 2 further illustrate directions X and Y which have the following significance. We have to consider more fully the relationship of a crystal such as 20 to the body of the tuning fork 10. One can see that the crystal is seated on the rim 15 with one of its flat sides so that one of the axial surface planes defined by this rim 15 is parallel to a two dimensional predominant extension of this crystal wafer 20; this is an x-y plane. The same holds true for the crystal wafer 30. The crystal 20 now has lateral boundaries of its thin sides at the narrow extension, in the third dimension which boundaries are all perpendicular to the surface extension x-y of the layers 21 and 22 and thus are perpendicular to the plane of predominant extensions of the crystal. Within this plane of extension (x-y) there is also a predominant direction of an extension of the crystals which is the direction X.

Crystal 20 for example has two somewhat curved boundaries 20a and 20b which, as was stated above, are the areas with which the crystal is bonded by means of the epoxy to the body 10 of the tuning fork. These boundaries are at the short ends of the crystal and extend substantially perpendicular to the direction X; the curvature does not change this general orientation. It can be seen further that the contour of such surfaces matches the circular contour of the aperture wall 14a of aperture 14 in the region of contact with the crystal. Thus, there are matching interfaces of crystal and tuning fork, which interfaces are arranged in face-to-face relationship, and they are mechanically coupled to each other through the thin layer of epoxy in between.

Looking now at FIGURE 2 one can see that the region 17, particularly in the area of a plane of symmetry (111) is in an antinodal region of the tuning fork when vibrating. This region 17 will vibrate in the direction X and at maximum amplitude in the plane 111. This plane 111 traverses the respective centers of the crystals. If an AC voltage is applied between the two layers 21 and 22 via lead-in wire 23, then the crystal 20 will begin to oscillate or vibrate. These mechanical virbrations have a maximum amplitude in the direction X, and particularly in the region traversed by the plane 111.

Thus, via the face-to-face contact (20a–14a) in the contact region 25 the crystal transfers its maximum amplitude vibrations to an antinodal region of the tuning fork which is thus agitated at maximum efficiency. The degree of effective agitation will, of course, depend on the frequency of the electrical signal, and if this frequency is equal to the resonant frequency of the tuning fork, maximum agitation will occur as the tuning fork offers minimum mechanical impedance. The region 17' is likewise an antinodal region but having a larger mechanical impedance so that the contract area 26 is primarily a reference base for the oscillations at the area 25.

The situation is similar for the symmetrically positioned crystal 30, and it can be seen that the two crystals 20 and 30 are indeed mounted in a symmetrical relationship to the entire fork construction such as the axial center plane running through the rim 15, and the two crystals are similarly oriented to the several boundaries and surfaces of the tuning fork. In particular, crystal 30 has corresponding areas of interaction with symmetrically positioned surfaces of the tuning fork, to define face-to-face relationships with the fork perpendicular to the predominant direction of extension which is the oscillation axis X. However, crystal 30 shall be considered from a different aspect.

As crystal 20 agitates the fork, the vibrations of regions 17 and 17' in the direction X tend to compress and expend the crystal 30 in its longest dimension (x). Thus the potential differences set up across electrodes 31 and 32 vary at the rate of the fork's vibration and always to some extent at the resonant frequency thereof. Any agitation of the fork will set up some resonant vibration in the fork, and the resonant vibrations are always the least damped, prevailing always after any kind of initial stimulus. Thus, the frequency of the electrical potential developed across crystal 30 will aways have a predominant or peak response at the resonant frequency of the tuning fork regardless of the frequency of the oscillation applied to crystal 20.

With reference to FIGURE 4 it shall be explained how the inventive tuning fork is used for establishing a train of undamped oscillation, preferably of constant amplitude. In view of the completely symmetrical structure it is entirely arbitarary which one of the crystals 20 or 30 is selected to be the driving crystal and which one is to be the sensing crystal. Presently we have assumed that 20 is the driving crystal and 30 is the sensing crystal so that the following can be said.

Assuming the tuning fork 10 has been stimulated to oscillate, then the two tines 11 and 12, particularly the tips thereof will oscillate in phase opposition in direction Y. The narrowed portion 17 of the tuning fork which is in the bottom of the U-shaped structure of the tuning fork, will then oscillate in directions X whereby, of course, the center of the region 17 vibrates at maximum amplitude as it is an antinodal region. Therefore, the crystal 30 is subjected to the maximum available deformation and this in turn produces the maximum possible voltage across the electrodes 31 and 32.

The wire 33 monitors the change in potential with reference to ground, and the wire 33, in particular, connects to the base electrode of a transistor 19 pertaining to the preamlifier, feeding its output in an emitter follower configuration to a driver state 29 which is likewise a transistor amplifier. The collector electrode of the transistor of driver stage 29 is the output of the driver stage and connects to the wire 23 feeding the crystal 20. The resistor 39 determines the degree of coupling of the loop. Crystals 20 and 30 if positioned as illustrated will always oscillate in phase, in view of the particular geometrical configuration illustrated this in-phase operation is of course essential.

It can thus be seen that the crystal 30 detects the vibrations of the tuning fork and develops a voltage in line 33 which is representative thereof. This voltage is amplified and drives crystal 20 to cause mechanical oscillations of maximum amplitude in the direction X and of like frequency and phase. This agitation reinforces the oscillations in the antinodal region 17 of the tuning fork and thereby maintains the fork in its oscillating state. The gain of the amplifiers 19 and 29 is of course adjusted so that oscillations are stable and that any mechanical damping is overcome. The damping results primarily from the requirement that the tuning fork must at some point be supported. However the gain must not be so great so as to destroy the crystals.

It can be seen that the regions 18 of the tuning fork likewise oscillate at resonant frequency but in phase opposition to the regions 17 and 17'. The regions 18 are bounded by wall portions of aperture 14 which extend perpendicular to the direction of oscillation X, which in this case now is the direction Y. Thus, during oscillations the, for example, normally round or circular aperture 14 undergoes an ellipitical deformation with the long axis of the ellipsis extending during one-half wave of oscillation in the directions X and during the respective other half in directions Y.

One can see that the crystals 20 and 30 could be displaced by rotating them by 90°, and again the direction of oscillation of the crystals and of the tuning fork portions would traverse interfaces extending perpendicularly to these directions of oscillations thereby ensuring again maximum transmission of mechanical energy. The selection of the mounting position for the crystal is primarily dictated by impedance considerations which differ from fork to fork construction, the size of the aperture 14, and its placement relative to the tines of the tuning fork.

One can see further that the transmission of energy in either case runs through the epoxy layers such as 25 and 26 as shown in FIGURE 1a in a manner which is not mechanically detrimental to the bonding. The layers 25 and 26 will be subjected to stress and compression only but not to shearing, so that loosening of the bond is not a serious factor to be considered. Furthermore one has to consider that the amplitudes of the oscillations are minute. The actual amplitudes produced are not too important because frequency stability is the principal factor of interest. Care must be taken, however, that the crystals will not be destroyed by too large an amplitude.

The embodiment of the invention shown in FIGURES 1, 2 and 3, can be regarded as characterized by the provision of two crystals arranged in symmetrical relation to their structural support on the fork and between two antinodal regions of the fork as far as the orientation of the direction of predominant extension of the crystals is concerned. This permits then the structural integration of the two crystals into a uniform crystal, and this is illustrated in FIGURES 5 and 6.

IN FIGURE 5 the crystal is shown by itself. The crystal 40 in this case has a body which on one of its flat sides has a continuous electrode layer 41, while the electrode layer on the other side is divided by a narrow groove or channel 44 into two layers 42 and 43. Thus, the biparted electrode 42, 43 has a narrow gap in between for electrically insulating these two electrode layers from each other. The two layers 42 and 43 may be of equal size but this is not essential. It is important, however, that the groove or gap extends in the direction of predominant extension of the crystal so that oscillations of maximum amplitude occur in the direction of the groove or gap 44. This way there is very little cross coupling between the crystal portion underneath electrode layer 42 and the crystal portion underneath electrode layer 43.

The crystal portion underneath electrode layer 42 can be regarded now as a sensing portion, and the crystal portion under electrode layer 43 can be regarded as the driving portion. FIGURE 6 shows that a tuning fork similar to the one shown in FIGURES 1, 2 and 3 can be used for cooperation with such a crystal. One could even use the same rim for seating the crystal but it is advisable to place the crystal centrally in order to observe strict, overall symmetry. It should be noted that actually a rim is not required, and the utilization of a rim for seating a crystal is only a matter of convenience as to manufacturing. The crystal may be simply kept in place by a bonding agent after it has hardened. It is then required that during manufacturing and when the epoxy is still in a plastic state, the crystal be accurately supported in relation to the fork until the epoxy has hardened.

FIGURE 6 illustrates the orientation of crystal 40 and it can be seen that there is a maximum interaction between the entire crystal and the regions 17 and 17' in the tuning fork in the direction of oscillation X and very little vibration occurs in direction Y. This is particularly so as the crystal portion underneath the gap 44 is, as far as the crystal is concerned, a nodal area with respect to directions Y.

As groove 44 extends in the direction X it appears that the crystal portion underneath electrode 42 senses the vibrations of regions 17 and 17' and derives a potential from the oscillating crystal portion, while the paricular crystal portion underneath electrode layer 42 receives very little agitation by the crystal portion underneath electrode 43. This latter portion in turn drives the fork, also in regions 17 and 17', and a driving potential is applied to electrode 43 accordingly. The electrical circuit of course will be the same as the one shown in FIGURE 4. One can see further that in case a rim such as 15 is not used, a solder contact must be provided to the layer 41 to provide for electrical connection to ground. This can be done directly thus circumventing the tuning fork 10 as electrical conductor.

The embodiment of the invention as particularly illustrated in FIGURES 1, 2, 3 and 6 uses a tuning fork a flat element which can be manufactured by way of stamping and thus can be manufactured very cheaply. A different way of manufacturing, not less cheap, is possible by using the embodiment shown in FIGURE 7 through 11.

Turning first to FIGURE 7 one can see that the tuning fork in this case is a flat strip, and that the tines are formed by bending this flat strip to thereby define tines 51 and 52 which are joined by a similar flat bottom portion 53 to complete a U-shaped configuration. FIGURES 8a and 8b illustrate rear views of the tuning fork 50, particularly of the outer bottom portion 53 thereof. Both views are possible as only the surface configurations of crystal 40 differ. A single crystal 40 of the type shown and explained with reference to FIGURE 5 is mounted on the outer bottom surface of strip portion 53. The two FIGURES 8a and 8b differ only in the direction of extension of the groove or gap 44.

Strictly speaking in side view of FIGURE 7 the groove 44 should be visible as in case of FIGURE 8a, but not in case of FIGURE 8b, but the groove is very shallow and layers 42 and 43 are very thin indeed. FIGURE 7 illustrates further that there is an anvil type supporting element 54 with a point or edge 55. The tip of this anvil should be small so as to not dissipate excess vibrational energy into the supporting element.

It can be seen that in this embodiment the groove or gap 44 runs over the central point of bottom portion 53 opposite to the area of attachment of tip 55 to the tuning fork. Thus, even in case of FIGURE 8b there will be very little cross coupling between the two crystal portions. The driving portion of the crystal here operates the tine or tines in the bending mode. In case of FIGURE 8a both tines are agitated, in case of FIGURE 8b only one tine is. Bending of the tines, in turn, stresses or compresses the sensing portion of the crystal. Thus upon vibration of the tines crystal 40 is stressed and compressed in the directions X, regardless of the orientation of the groove or gap 44.

FIGURE 9 does not require elaborate description, since it merely illustrates that supporting element or anvil 54 and crystal 40 can be attached at either side of bottom 54 of the fork. However, the form of FIGURE 7 is the preferred one, because one can see that the surface area of thew ork are available for attachment to a crystal is larger so that a larger crystal can be employed, which in turn, of course, decreases the required gain of the amplifier. The amplifier interconnects the sensing crystal portion and the driving crystal portion in a manner as aforedescribed (FIGURE 4).

Figure 10:
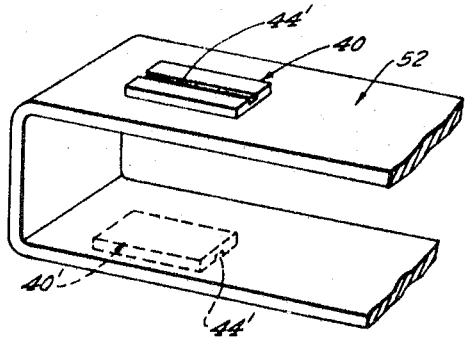
FIGURE 10 illustrates an isometric view of a portion of a tuning fork, in accordance with another embodiment of the present invention.
Figure 11:
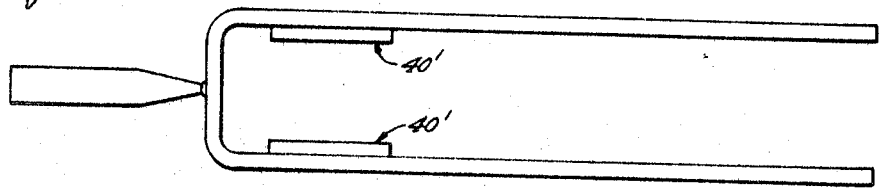
FIGURE 11 illustrates a side elevation of a tuning fork which is a somewhat modified structure in comparison with the tuning fork illustrated in FIGURE 10.

Proceeding now to the description of FIGURES 10 and 11 there is illustrated a similar type fork comprised of a bent strip 50, but in this case now there are two biparted crystals of the type illustrated in FIGURE 5. There is one crystal on each tine 51 and 52, whereby both crystals 40 and 40' can be arranged either inside of the tines or outside thereof. An arrangement of one crystal inside and one crystal outside is possible provided the crystals have been polarized in a proper relationship for operation in the electric circuit. The grooves 44 and 44' of the two crystals should extend in the direction of extension of the tines in order to operate at maximum efficiency in the bending mode.

Figure 12:
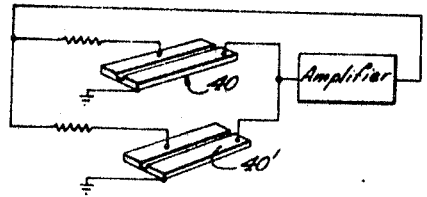
FIGURE 12 illustrates schematically a circuit diagram for operating the tuning fork illustrated in FIGURE 11.

FIGURE 12 illustrates somewhat schematically the driving and sensing circuit to be employed in this case. There is preferably provided a common amplifier and joint input and output wires. Each one of the crystals 40 and 40' has a driving portion and a sensing portion. The two driving portions are interconnected electrically leading to the output side of the amplifier to receive similar signals therefrom. The two sensing portions of the two crystals are likewise interconnected electrically to provide a common input for the amplifier. The circuit arrangement ensures that the oscillations (mechanically) of the tuning fork and the electrical signals in the two crystals are always in phase.

This arrangement as illustrated in FIGURES 11 and 12 has a particular advantage which relates to the problems that may arise in case of an external disturbance. If an external shock wave affects the tuning fork, the shock wave will be effective in both tines and in similar direction, but as far as the transmission of the shock into the two crystals is concerned, these shocks are in phase opposition. This means that the disturbance as sensed individually by the two sensing portions of the crystals 40 and 40' cancel each other out at the amplified input, so that the amplifier loop does not operate as a circuit which reinforces such a disturbance.

FIGURES 13, 14 and 15 illustrate another embodiment of the invention whereby FIGURE 15 can be construed as a view into the inner bottom of either one of the forks illustrated in FIGURES 13 and 14, because in both cases the inner bottom is always completely covered by a crystal such as 40. The embodiment shown here is a tuning fork which is machined and comprises a body 60 (FIGURE 13) with tines 61 and 62 extending from this body 60. In FIGURE 13 the massive structure of the body 60 provides for a high mechanical impedance which at times may be desirable. This is particularly so in cases where oscillations are subjected to switching operations, for example, in that the control loop is interrupted by external control action. In this case then a rapid decay of the oscillations may be desired. The body 60' shown in FIGURE 14 has a slot 63 across which extends the crystal 40. The slot 63 reduces the mechanical impedance of this type of tuning fork.

In either case one can see that the crystal has interfaces with the body of the tuning fork such as illustrated in areas 65, 66 whereby again the predominant direction of oscillation of the crystal is effective perpendicularly to the respective interfaces so that there is face-to-face contact and vibration transfer perpendicularly to the contact area.

FIGURE 16 illustrates an embodiment of the invention which is actually an improvement of the embodiment shown in FIGURES 1 to 6. For purposes of further increasing the Q and reducing the production of harmonics the structures is selected to have two transverse planes 111 and 112 of structural symmetry. The aperture for holding the crystal is centrally located to the line of intersection of these two planes of symmetry. There are accordingly four tines, and the center of the crystal or pair of crystals coincide with the geometric center of the fork which is traversed by the said line of intersection. The crystals here oscillate in the direction Y.

This geometry will perform equally well with the crystals turned 90° to that shown in FIGURE 16, thus oscillating in the direction X.

The invention is not limited to the embodiments described above, but all changes and modifications thereof not constituting departures from the spirit and scope of the invention are intended to be covered by the following claims.

What is claimed is:
1. A tuning fork comprising:
  a vibrating member having tines extending from a body portion of the member;
  piezoelectric means including a piezoelectric driving means and a piezo electric vibration sensing means, said driving and said sensing means being individually coupled to the member in a spatial relationship so that the portion of the member agitated by the piezoelectric driving means is coplanar with the portion of the member the vibration of which is monitored by the piezoelectric sensing means;

first electrode means on the piezoelectric driving means for receiving an AC voltage to agitate the piezoelectric driving means; and second electrode means on the piezoelectric sensing means to provide an AC voltage representative of the vibration of said member.

2. A tuning fork as set forth in claim 1, said piezoelectric means including a flat integral crystal, said first and second electrode means comprising a pair of electrodes on one flat side thereof, said pair of electrodes being separated by a narrow gap, and a single electrode on the opposite flat side of the said crystal.

3. A tuning fork as set forth in claim 1, said piezoelectric means being mounted to said member in face-to-face contact relationship therewith so that the area of contact extends perpedicularly to the predominant extension of said electrode means.

4. A tuning fork comprising:

a member having tines extending symmetrically to each other and to a joining portion, the member and its tines being capable of undergoing oscillations and having particular areas of its surface oscillating perpendicularly to the respective extension of such areas; and a flat piezoelectric crystal having electrodes on its flat sides and having a pair of oppositely facing circumferential surface areas mechanically coupled to corresponding areas of the surface of said member arranged symmetrically to a plane of symmetry of the member so that mechanically oscillations perpendicular to said coupled surface portions are transferred as between said crystal and said member.

5. A tuning fork as set forth in claim 4 having a first electrode on one of said flat sides of the crystal and being electrically connected to said member, and second and third electrodes of the other one of said flat sides, being electrically insulated from each other and from said member.

6. A tuning fork as set forth in claim 5, said second and third electrodes being separated by a narrow gap extending substantially perpendicularly to the said coupled surface portions.

7. A tuning fork comprising:

a member having tines extending symmetrically to each other and to a joining portion, the member and its tines being capable of undergoing oscillations and having particular surface areas oscillating perpendicularly to their extension;

a first piezoelectric crystal having a pair of oppositely oriented surface areas coupled to a first pair of antinodal surface areas of said member in face-to-face relationship therewith so that oscillations of said member effective in directions transverse to said coupled surface areas, are transmitted to said crystal for the development of electrical signals therein;

a second piezoelectric crystal having a pair of oppositely oriented surface areas coupled to a second pair of antinodal surfaces areas of said member and in face to face relationship therewith so that oscillations of said second crystal are effective in directions transverse to said latter coupled surface areas and are transmitted to said member for causing said member to vibrate; and means coupled to said second crystal for receiving electrical signals which cause said second crystal to set up said vibrations.

8. A tuning fork as set forth in claim 7, said first and second crystals being arranged symmetrical to a preselected plane of symmetry of said member, said coupled surfaces of said crystals being also symmetrical to said plane.

9. A tuning fork comprising:

a member having two tines extending symetrically to each other and to a joining portion, and two piezoelectric crystals respectively mounted on surface areas of said tines, said tines undergoing vibrations perpendicular to the surface areas, each crystal having a first electrode in electrical contact with said member, each crystal having second and third electrodes, separated along the axis of vibrations, electrically insulated from each other and the member, the second electrodes of each of said crystal for sensing oscillations of said tines, the third electrodes of said member for driving both of said crystals to impart oscillations on both of said tines.

10. A tuning fork comprising:

a flat member having tines extending symmetrically to a selected plane of symmetry and having a flat joining portion, there being an aperture traversing said joining portion the aperture being located symmetrically to said tines, said aperture being defined by a wall having a first pair of oppositely located wall areas which upon vibrations of said tines vibrate in a direction that extends in said plane, said wall having a second pair of oppositely located wall areas oscillating in a direction transverse to said plane;

piezoelectric means having oppositely facing surface areas capable of undergoing oscillations in opposite directions upon electric excitation and being mounted in coupling face to face engagement with one of said pairs of wall areas, said piezoelectric means having electrodes for applying an electrical signal to said crystal means to set up oscillations in at least a portion of said piezoelectric means in said opposite directions coinciding with the direction of vibrations of the pair of wall areas of said member to which said piezoelectric means is coupled in face to face relationship.

11. A tuning fork as set forth in claim 10, said piezoelectric means comprising a first and a second piezoelectric element said first element coupled to one of said pairs of wall areas to transmit thereto oscillations perpendicular to the extension of said latter wall portions, the second element being coupled to one of said pairs of walls to detect oscillations thereof and to develop electrical signals representative thereof.

12. A tuning fork as set forth in claim 10, said flat member having two pairs of tines, extending transversely to two intersecting planes of symmetry, said aperture being at least approximately centrally traversed by the line of intersection of said planes.

13. A tuning fork, comprising:

a member having vibrating tines and joining portion to provide for an integral structure, and have two oppositely directed surface portions which vibrate substantially colinear and in opposite directions, which directions extends perpendicular to the respective areas of extension of the surface portions;

a flat piezoelectric crystal having a direction of predominant extension and having two oppositely oriented short sides coupled for mechanical interaction respectively with said two surface portions, so that said direction of predominant extension substantially coincides with said directions of vibrations; and electrode means on the flat sides of said crystal, electrically insulated from each other.

14. A tuning fork as set forth in claim 13 the electrode means on one of said flat sides comprising two electrodes separatedby a narrow gap extending substantially in said directions of vibration.

15. A tuning fork comprising:

a member having at least one tine for vibration, and a flat piezoelectric crystal mounted on said member for vibrating interaction therewith, said flat crystal having a direction of predominant extension, said crystal further having an electrode on one flat side of said crystal electrically connected to said member, and a second and third electrode on the opposite flat side of said crystal, said second and third electrodes being separated from each other by a narrow gap for electrical insulation which gap extends substantially in said direction.

16. A tuning fork comprising a flat element bent to form two tines, and having a piezoelectric crystal mounted on said element for bending both of said tines when oscillating;
   first electrode means on said crystal to receive an electrical signal for causing said crystal to oscillate; and
   second electrode means on said crystal separated from said first electrode means by a narrow gap extending in the direction of crystal oscillation, the second electrode means being electrically insulated from said first electrode means, for developing an electrical signal indicative of the mechanical oscillations of said crystal.

17. A vibrator, comprising:
   a tine capable of vibrating;
   a flat piezoelectric crystal mounted on said tine with one of its flat sides for bending said tine when oscillating;
   first electrode means on the other flat side of said crystal to receive an electrical signal for causing said crystal to oscillate; and
   second electrode means on said other flat side of said crystal, separated from said first electrode means by a narrow gap and being electrically insulated from said first electrode means, for developing an electrical signal indicative of the mechanical oscillations of said crystal.

18. A tuning fork comprising:
   a member having tines extending symmetrically to each other and to a joining portion, the member having nodal and antinodal areas, including at least one pair of antinodal surface areas remote from the free ends of the tines and oscillating colinear and relative to each other; and
   a piezoelectric crystal device having two oppositely oriented surface areas and at least two electrodes mounted transverse to said surface areas of the device and on opposite sides of the device, the device being mounted to the member so that the two surface areas of the device are respectively coupled to the surface areas of the pair of the member to oscillate in unison therewith.

19. A tuning fork comprising:
   a vibrating member having tines extending from a body portion of the member, there being at least one plane of symmetry in the member; and
   a piezoelectric device having a preferred axis of extension for vibrations of end portions of the device along the axis in opposite directions, the device being mounted to the member for vibrating interaction of the end portions with the member and at an orientation so that the axis is transverse to the plane of symmetry, and the end portions where interacting with the member are symmetrically arranged to the plane of symmetry.

20. A tuning fork comprising:
   a vibrating member having tines extending from a body portion of the member, there being an aperture in the body portion;
   a ring-shaped shelf in the aperture;
   a pair of piezoelectric devices, one on each side of the shelf, each device having oppositely facing end faces coupled for vibratory interaction with oppositely facing wall areas of the aperture, the wall areas extending transverse to the shelf;
   first electrodes coupled to one of said pairs of devices for providing thereto electrical energy, so that the one device vibrates and in phase opposition as to its end face; and
   second electrodes coupled to the other one of the pair of devices to derive therefrom a signal upon agitation of the other one of the devices.

References Cited
UNITED STATES PATENTS

| | | | |
|---|---|---|---|
| 1,693,806 | 12/1928 | Cady | 84—409 |
| 2,081,405 | 5/1937 | Mason | 84—409 |
| 2,230,649 | 2/1941 | Mason | 310—9.6 |
| 2,666,196 | 1/1954 | Kinsley | 310—8.2 |
| 3,024,429 | 2/1962 | Cavalieri | 333—72 |
| 3,106,124 | 10/1963 | Asten | 310—25 |
| 3,128,397 | 4/1964 | Shinada | 310—9.5 |
| 3,138,726 | 6/1964 | Samuelson | 310—8.1 |
| 3,241,092 | 3/1966 | Yoyoshima | 333—72 |
| 3,354,413 | 11/1967 | Ko | 310—9.6 |
| 3,345,588 | 10/1967 | Chesney | 310—9.6 |

FOREIGN PATENTS 311,742    6/1930    Great Britain.

J. D. MILLER, Primary Examiner

U.S. Cl. X.R.

84—409; 331—154, 156; 333—72